(12) United States Patent
Hahn et al.

(10) Patent No.: US 9,740,879 B2
(45) Date of Patent: Aug. 22, 2017

(54) SEARCHABLE ENCRYPTION WITH SECURE AND EFFICIENT UPDATES

(71) Applicants: Florian Hahn, Karlsruhe (DE); Florian Kerschbaum, Karlsruhe (DE)

(72) Inventors: Florian Hahn, Karlsruhe (DE); Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 126 days.

(21) Appl. No.: 14/526,823

(22) Filed: Oct. 29, 2014

(65) Prior Publication Data

US 2016/0125198 A1 May 5, 2016

(51) Int. Cl.
*G06F 21/62* (2013.01)

(52) U.S. Cl.
CPC ...... *G06F 21/6227* (2013.01); *G06F 21/6218* (2013.01); *G06F 21/6245* (2013.01)

(58) Field of Classification Search
CPC ............. G06F 21/6227; G06F 21/6245; G06F 21/6218; H04L 9/3013; H04L 9/3213
USPC .......... 713/165, 185, 193; 707/741, 757–758
See application file for complete search history.

(56) References Cited

U.S. PATENT DOCUMENTS

| | | | |
|---|---|---|---|
| 7,818,200 B2 | 10/2010 | Kerschbaum et al. | |
| 7,836,483 B2 | 11/2010 | Kerschbaum et al. | |
| 7,860,244 B2 | 12/2010 | Kerschbaum | |
| 7,860,245 B2 | 12/2010 | Kerschbaum et al. | |
| 7,869,598 B2 | 1/2011 | Kerschbaum | |
| 7,986,780 B2 | 7/2011 | Kerschbaum et al. | |
| 7,995,750 B2 | 8/2011 | Kerschbaum et al. | |
| 8,010,782 B2 | 8/2011 | Kerschbaum | |
| 8,015,080 B2 | 9/2011 | Kerschbaum et al. | |
| 8,045,711 B2 | 10/2011 | Kerschbaum et al. | |
| 8,060,758 B2 | 11/2011 | Kerschbaum et al. | |
| 8,130,947 B2 | 3/2012 | Kerschbaum et al. | |
| 8,131,999 B2 | 3/2012 | Kerschbaum | |
| 8,150,041 B2 | 4/2012 | Kerschbaum | |
| 8,291,509 B2* | 10/2012 | Kerschbaum ....... | G06F 21/6245 713/185 |
| 8,321,666 B2 | 11/2012 | Kerschbaum | |

(Continued)

OTHER PUBLICATIONS

Seny Kamara et al, Parallel and Dynamic Searchable Symmetric Encryption, pp. 258-274, Springer-Verlag, 2013.*

(Continued)

*Primary Examiner* — Shanto M Abedin
(74) *Attorney, Agent, or Firm* — Fish & Richardson P.C.

(57) ABSTRACT

Methods, systems, and computer-readable storage media for selecting columns for using searchable encryption to query a database storing encrypted data. Implementations include actions of receiving a set of search indices, receiving a search token, and in response: searching at least one search index of the set of search indices based on the search token, and determining that the at least one search index is absent an entry corresponding to the search token, and in response, receiving one or more identifiers, each identifier being associated with a respective ciphertext that is determined to be responsive to the search token, and updating the at least one index to include an entry based on the search token and the one or more identifiers; and transmitting search results, the search results including the one or more ciphertexts that are determined to be responsive to the search token.

20 Claims, 5 Drawing Sheets

(56) References Cited

U.S. PATENT DOCUMENTS

| | | |
|---|---|---|
| 8,365,298 B2 | 1/2013 | Kerschbaum et al. |
| 8,473,741 B2 | 6/2013 | Kerschbaum |
| 8,526,603 B2 | 9/2013 | Kerschbaum |
| 8,533,487 B2 | 9/2013 | Kerschbaum et al. |
| 8,538,799 B2 | 9/2013 | Haller et al. |
| 8,548,172 B2 | 10/2013 | Kerschbaum |
| 8,572,405 B2 | 10/2013 | Kerschbaum |
| 8,584,232 B2 | 11/2013 | Kerschbaum |
| 8,688,973 B2 | 4/2014 | Kerschbaum et al. |
| 8,731,199 B2 | 5/2014 | Jawurek et al. |
| 8,811,620 B2 | 8/2014 | Chaves et al. |
| 8,839,410 B2 | 9/2014 | Kerschbaum |
| 2007/0255698 A1* | 11/2007 | Kaminaga ......... G06F 17/30522 |
| 2008/0263650 A1 | 10/2008 | Kerschbaum |
| 2009/0055382 A1 | 2/2009 | Kerschbaum |
| 2009/0300351 A1* | 12/2009 | Lei .................. G06F 17/30864 713/165 |
| 2010/0106980 A1* | 4/2010 | Kerschbaum ......... H04L 9/3013 713/193 |
| 2010/0114964 A1* | 5/2010 | Kerschbaum ....... G06F 21/6245 707/783 |
| 2010/0329464 A1 | 12/2010 | Kerschbaum |
| 2010/0332479 A1* | 12/2010 | Prahlad ................ G06F 17/302 707/741 |
| 2011/0145594 A1* | 6/2011 | Jho ...................... G06F 21/602 713/189 |
| 2012/0078914 A1* | 3/2012 | Roeder ............ G06F 17/30619 707/741 |
| 2012/0121080 A1 | 5/2012 | Kerschbaum |
| 2013/0046974 A1* | 2/2013 | Kamara ............ G06F 21/6218 713/165 |
| 2013/0262852 A1* | 10/2013 | Roeder ................. H04L 9/0894 713/150 |
| 2013/0275743 A1 | 10/2013 | Jawurek et al. |
| 2013/0297929 A1 | 11/2013 | Chaves et al. |
| 2014/0032926 A1* | 1/2014 | Prem ..................... G06F 21/602 713/189 |
| 2014/0130173 A1 | 5/2014 | Kerschbaum |
| 2014/0351260 A1* | 11/2014 | Sundaram .............. G06F 21/00 707/741 |
| 2015/0039903 A1* | 2/2015 | Cash ..................... G06F 21/602 713/189 |
| 2015/0143112 A1* | 5/2015 | Yavuz ................. G06F 17/3033 713/165 |
| 2016/0117521 A1* | 4/2016 | Spalka ................ G06F 21/6227 713/171 |

OTHER PUBLICATIONS

M. Chuah et al, Privacy-aware BedTree Based Solution for Fuzzy Multi-keyword Search over Encrypted Data, IEEE, 2011.*
Seny Kamara et al, Dynamic Searchable Symmetric Encryption, ACM, 2012.*
Hiroaki Kikuchi et al, Secret Sharing Scheme with Efficient Keyword Search for Cloud Storage, IEEE, 2014.*

* cited by examiner

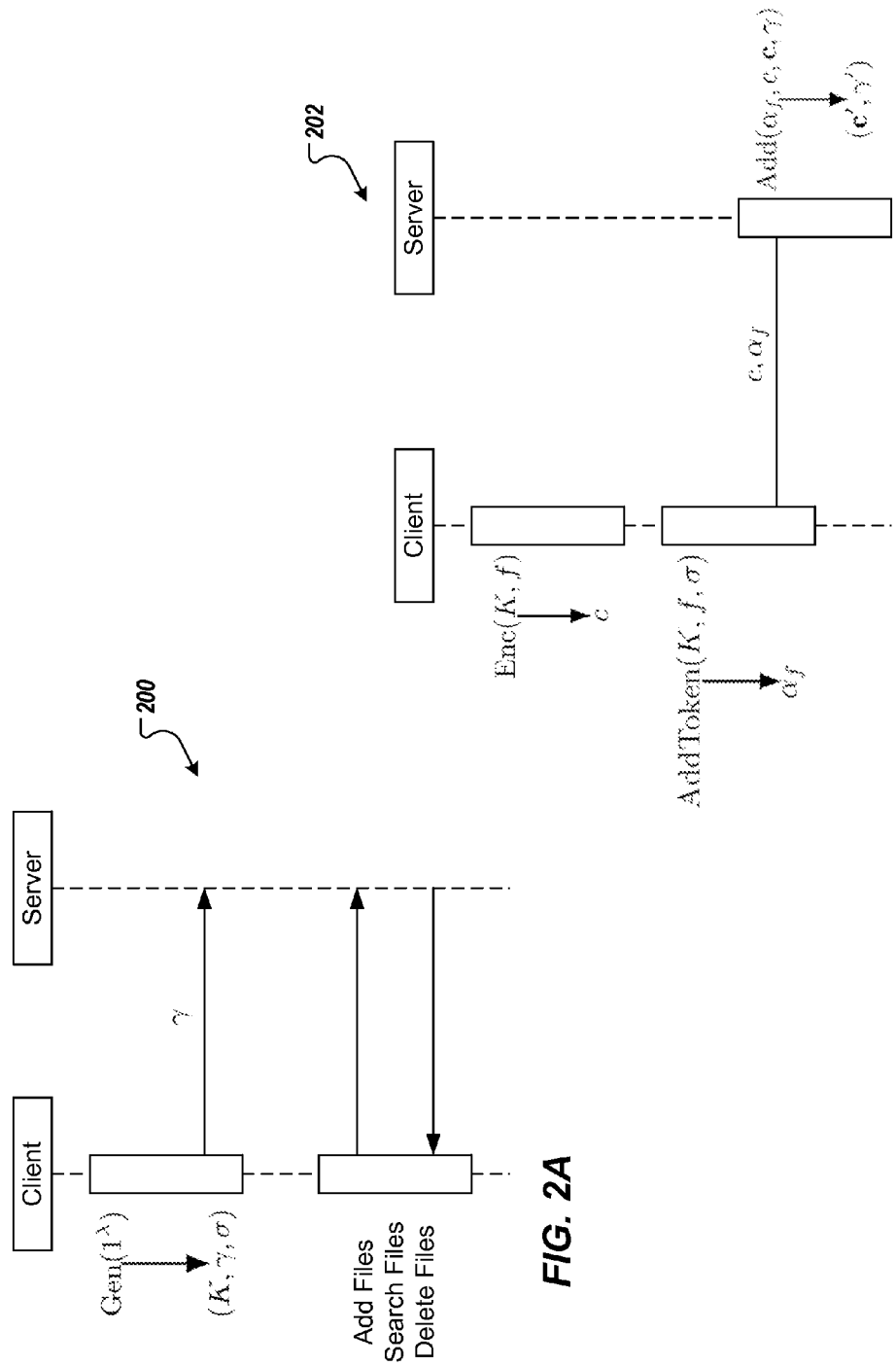

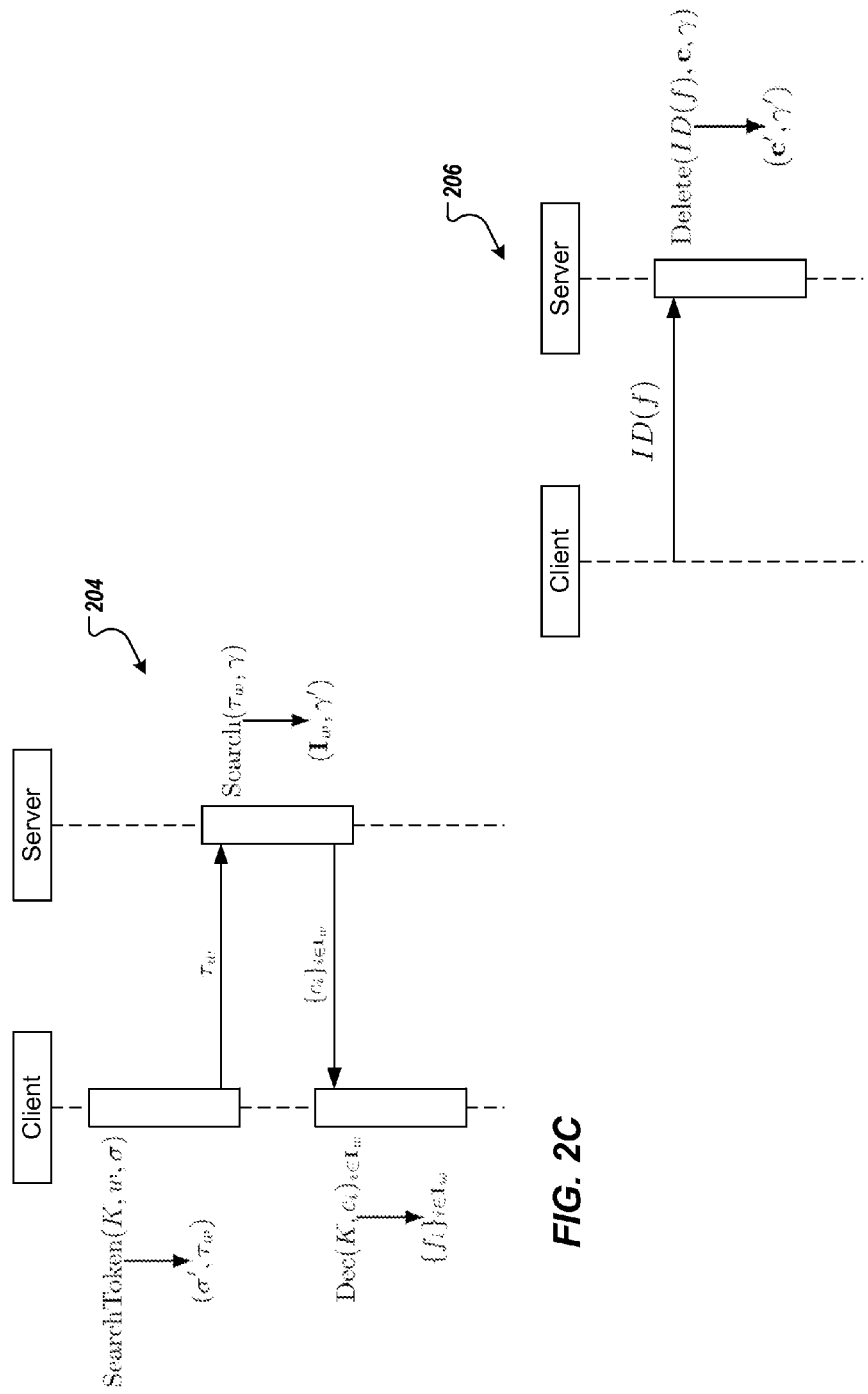

SEARCHABLE ENCRYPTION WITH SECURE AND EFFICIENT UPDATES

BACKGROUND

Encrypted databases provide data protection (security) in cloud platforms and/or database-as-a-service settings. In encrypted databases, data can be encrypted at the client and can be provided to the database for storage. Searchable encryption enables data to be encrypted, while still enabling search for keywords.

Searchable encryption is an active area of research and a number of schemes with different efficiency and security characteristics have been proposed. Currently proposed searchable encryption schemes, however, suffer from various drawbacks. In some examples, current searchable encryption schemes either deteriorate from semantic security to the security of deterministic encryption (e.g., under update operations), require information to be stored on the client, and relatively large index sizes are required for deleted files and keywords. All of this is problematic, because the majority of data is expected to be added later or changed. Because such searchable encryption schemes are also less efficient than deterministic encryption, they are currently an unfavorable choice for encryption in the cloud.

SUMMARY

Implementations of the present disclosure include computer-implemented methods for providing searchable encryption for encrypted data stored in one or more databases. In some implementations, actions include receiving a set of search indices, receiving a search token, and in response: searching at least one search index of the set of search indices based on the search token, and determining that the at least one search index is absent an entry corresponding to the search token, and in response, receiving one or more identifiers, each identifier being associated with a respective ciphertext that is determined to be responsive to the search token, and updating the at least one index to include an entry based on the search token and the one or more identifiers; and transmitting search results, the search results including the one or more ciphertexts that are determined to be responsive to the search token. Other implementations of this aspect include corresponding systems, apparatus, and computer programs, configured to perform the actions of the methods, encoded on computer storage devices.

These and other implementations can each optionally include one or more of the following features: actions further include receiving an add token and a ciphertext, and in response, updating the set of search indices based on the add token; the add token includes an identifier assigned to the ciphertext and search tokens associated with the ciphertext, the search tokens having been used for a previous search actions further include receiving an identifier assigned to a ciphertext that is stored as encrypted data in the database, and in response: deleting the ciphertext, and updating the at least on index of the set of indices; the set of search indices are provided based on a set of keys stored at a client-side computing device and are received from the client-side computing device, at least one key in the set of keys being used to provide the encrypted data stored in the database; the search token comprises an encrypted keyword; and the set of search indices includes an encrypted document index and an encrypted keyword index, the encrypted keyword index being an inversion of the encrypted document index.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 2A-2D depict example protocols in accordance with implementations of the present disclosure.

Like reference symbols in the various drawings indicate like elements.

DETAILED DESCRIPTION

Figure 1:
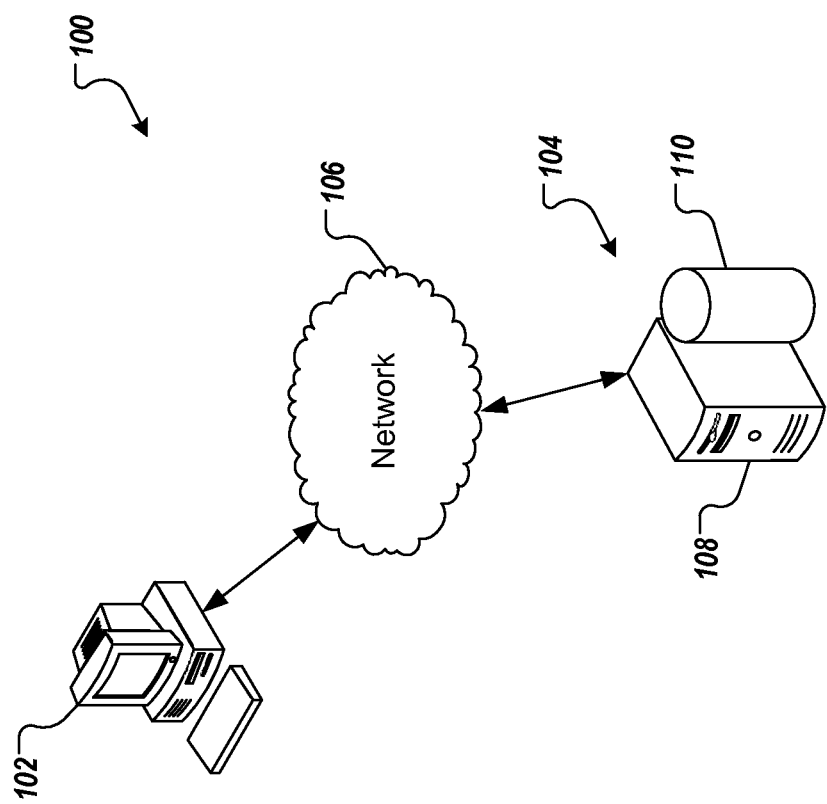
FIG. 1 depicts an example high-level architecture in accordance with implementations of the present disclosure.

Implementations of the present disclosure are generally directed to a searchable encryption scheme that is dynamic, efficient and secure. More particularly, implementations of the present disclosure include a securely updating index-based searchable encryption scheme (SUISE) that provides dynamic, efficient and secure searching of encrypted data stored in a database. In some implementations, and as described in further detail herein, a non-index based search is initially performed using linear scans, a (deterministic) search token and the access pattern are determined, and a search index is populated using the search token and the accessed ciphertexts (access pattern). When a subsequent search is performed for the same keyword (search token), the search index is used to search in constant time.

In general, searchable symmetric encryption (also referred to as searchable encryption) includes multiple operations. For example, encryption transforms a keyword-file pair into a ciphertext using a secret key. The secret key can be used to generate a search token for a specific keyword. Using the search token, a set of ciphertexts can be searched for ciphertexts that match the keyword. In this manner, data can be encrypted, and searched without decryption.

One application for searchable encryption is cloud storage, where a customer outsources data storage to a third-party service provided. In some examples, the customer encrypts the data (e.g., files) for confidentiality using an encryption key (secret key), and provides the encrypted data to the third-party service provider. Searchable encryption provides an advantage (e.g., compared to standard encryption) in that search operations can be performed at the third-party service provider without the secret key, and returns a search results for a query. Consequently, the customer (e.g., client-side) is not required to download the entire data set and perform the search on the client-side.

A practical searchable encryption scheme should be efficient, dynamic and secure. In some examples, efficiency is provided as sub-linear search time, which can be achieved using an inverted index. Indices can be difficult to update, particularly if the indices are encrypted. Although efficient, dynamic searchable encryption enables indices to be updated, traditional searchable encryption schemes leak a deterministic function of the keyword during an update, require client-side storage, additional storage that is linear in the number of deletes, and/or have an index size of the number of documents times the number of keywords. This is problematic, because, in long-running systems, the majority of data will be later added, changed or deleted. Consequently, a long-running system using traditional searchable encryption schemes is either less secure (due to information leakage) or very inefficient in storage. Further, because deterministic encryption is relatively efficient, searchable encryption becomes an unfavorable choice for cloud storage systems.

In view of this, implementations of the present disclosure provide a dynamic searchable encryption scheme with secure and efficient updates. Even under updates, the searchable encryption scheme of the present disclosure leaks no more information than that, which can be inferred from the search tokens. Further, the index is linear in the number of keywords (hence asymptotically optimal) and client-side storage (except the encryption key) is optional. In some implementations, while the time for the initial search of a keyword is linear in the number of keywords, the time amortizes over multiple searches of the keyword, with a theoretic upper bound for amortization in $O(n^2)$ searches, where n is the number of unique keywords stored in the ciphertexts. Consequently, the searchable encryption scheme of the present disclosure offers a viable alternative for secure storage of data in the cloud, is nearly as efficient as deterministic encryption having the same overall search complexity, and provides enhanced security, leaking only the access pattern of files.

FIG. 1 depicts an example high-level architecture 100 in accordance with implementations of the present disclosure. The high-level architecture 100 includes a computing device 102, e.g., client-side, a server system 104 and a network 106. In some examples, the computing device 102 and the server system 104 communicate over the network 106. In some examples, the computing device 102 can communicate with the server device 104 over one or more networks, e.g. the network 106. In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server device 104 includes at least one server and at least one data store. In the example of FIG. 1, the server device 104 is intended to represent various forms of servers including, but not limited to a web server, an application server, a proxy server, a network server, and/or a server pool. In general, server systems accept requests for application services and provides such services to any number of client devices, e.g., the computing device 102, over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server system 104 can maintain a database that stores encrypted data, e.g., an encrypted database. In some examples, the data is encrypted at the computing device 102, and the encrypted data is sent to the server system 104 over the network 106 for storage. In some implementations, and as described herein, the server system 104 can be provided by a third-party service provider, which stores and provides access to the encrypted data.

As described in further detail herein, implementations of the present disclosure provide a searchable encryption scheme that is dynamic, efficient and secure. With regard to being dynamic, the searchable encryption scheme of the present disclosure enables data to be added, deleted and changed after the initial outsourcing (e.g., customer providing encrypted data to third-party service provider for storage). In some examples, encrypted data is incrementally outsourced (e.g., as opposed to an initial, bulk outsourcing operation). With regard to efficiency, the searchable encryption scheme of the present disclosure provides asymptotically optimal, sub-linear search time. For example, an example Java-based implementation of the searchable encryption scheme of the present disclosure shows that a search in a collection with 300,000 keywords and documents can be performed in an average of 70 milliseconds. In some examples, only two cryptographic hash values are stored per keyword and document. With regard to being secure, security can be formalized using a simulation-based definition. In some examples, the searchable encryption scheme of the present disclosure is semantically secure unless a search token has been revealed.

As introduced above, searchable encryption includes encryption, token generation, and search. In some examples, encryption takes a plaintext (e.g., a file identifier), a set of keywords (e.g., one or more keywords), and an encryption key as input. Encryption produces a ciphertext (e.g., encrypted data) that can be outsourced to a server (e.g., of a third-party service provider), while the customer (e.g., client) retains the encryption key. In some examples, a client-side computing device provides a search token for a keyword. In some examples, the search token is provided to a server-side computing device of the third-party service provider with a search query, and the server-side computing device uses the search token to receive a set of ciphertexts (e.g., zero or more ciphertexts) that are responsive to the underlying keyword. In some examples, the third-party service provider is able to learn the set of ciphertexts that are responsive to the search query. The set of ciphertexts are also referred to as the access pattern for the search query. Searchable encryption can secure outsourcing of data by retaining the encryption key at the client.

In accordance with implementations of the present disclosure, an index is learned based on the access patterns of the respective keywords (respective search tokens of the keywords). In some examples, an inverted index based searchable encryption scheme that requires linear scans is used to search the encrypted data. For each search operation a respective search token, which is deterministic, and the respective access pattern are learned. An index is populated with each search token and the returned ciphertexts (the access pattern). In some examples, when a keyword is searched again, the index can be used to search in constant time. That is, for example, the search token corresponding to the keyword can be used as an input to the index to retrieve the ciphertexts (e.g., which had been returned from the third-party service provider in the initial search operation). Over the long run, the initial linear search time amortizes, and asymptotically optimal search time is achieved, while leaking only the access patterns of respective keywords. In some examples, the access patterns of past searches extend to the future. That is, a search token stays valid and can be used to match against future ciphertexts (e.g., until the entire system is rekeyed).

In some implementations, a history of previously submitted search tokens can be maintained (e.g., stored) at the client-side, such that add tokens for files with previously searched keywords can be augmented with these keywords. In some examples, this improves performance for adding new files. In some examples, the history can be stored at the server-side, but at a higher update cost. Furthermore, if the history is lost at the client-side, the history can be restored based on the information provided at the server-side.

Implementations of the present disclosure are described in further detail herein with reference to the following example definitions. A set of binary strings of length n is denoted as $\{0, 1\}^n$, and a set of all finite binary strings is denoted as $\{0, 1\}^*$. Given a binary string u, len(u) is the bit length of the binary string u. Given two binary strings u, v, the concatenation is provided as u||v. The notation [1, n] with n $\in \mathbb{N}$ denotes the integer set $\{1, \ldots, n\}$. The output z of a (possibly probabilistic) algorithm A is denoted as $z \leftarrow A$. Uniformly random sampling from a set X is denoted as $x \leftarrow X$.

A security parameter $\lambda$ is provided. A function $f: \mathbb{N} \rightarrow \mathbb{R}$ is negligible in x, if, for every positive polynomial $p(\cdot)$ there exists a $x_0$, such that for all $x > x_0$, $f(x) < 1/p(\cdot)$. In some examples, it is assumed that each file $f$ has a unique file identifier ID($f$), and includes words, such that $f=(w_1, \ldots, w_{len(f)})$, where $w_i \in \{0,1\}^*$. For a fileset $\mathbb{f}$, len($\mathbb{f}$) is provided as the number of files in $\mathbb{f}$. Given a keyword w, $f_w$ is provided as the subset of all files $f$ that contain w. In addition, the set of all file identifiers that contain the keyword w is provided as $\mathbb{I}$, which can be defined as $\mathbb{I}_w = \{ID(f_i): f_i \in f_w\}$.

In some implementations, an empty search index Y is provided for the server-side (e.g., the third-party service provider). In some examples, the search index Y and a set of encrypted files c are updated by file-specific add tokens $\alpha_f$ for file $f$ and its encryption. In some examples, to perform a search query for keyword w, the client-side computing device provides a deterministic search token $\tau_w$ that is transmitted to the server-side computing device. For simplicity of the present discussion, it can be assumed that all search tokens are provided to the server-side computing device (i.e., to the third-party service provider). That is, if a search token has been created by the client-side computing device, the third-party service provider gains knowledge of it. In some examples, to delete a file $f$, the client-side computing devices transmits the corresponding file identifier ID($f$) to the service provider with a delete instruction.

With reference to FIGS. 2A-2D, the securely updating index-based searchable encryption scheme (SUISE) of the present disclosure will be described in further detail. In some implementations, the searchable encryption scheme of the present disclosure uses indistinguishability under chosen plaintext attack (IND-CPA) secure secret-key encryption (e.g., SKE=($g^{IND-CPA}$, $\epsilon^{IND-CPA}$, $D^{IND-CPA}$)), a pseudorandom number generator G that outputs random numbers with bit length $\lambda$ and a pseudorandom functions F: $\{0,1\}^\lambda \times \{0,1\}^* \rightarrow \{0,1\}^\lambda$, and a random oracle H: $\{0,1\}^{\lambda \times} \{0,1\}^* \rightarrow \{0,1\}^\lambda$. In some examples, the searchable encryption scheme of the present disclosure is provided as a tuple of (possibly probabilistic) polynomial-time operations. For example:

SUISE=(Gen, Enc, SearchToken, Search, AddToken, Add, Delete, Dec)

where Gen is an operation to generate a search index and secret key, Enc is an encryption operation, SearchToken is search token generation operation, Search is a search operation, AddToken is an add token operation, Add is an operation to update the search index, Delete is an operation to delete a file, and Dec is an operation to decrypt a file.

FIGS. 2A-2D depict example protocols in accordance with implementations of the present disclosure. More particularly, the example protocols of FIGS. 2A-2D implement the operations introduced above. With reference to FIG. 2A, an initial setup protocol 200 is depicted to provide an empty search index Y. In some examples, Gen is a probabilistic operation that takes the security parameter $\lambda$ as input and outputs a secret key K, an empty search index Y and an empty search history $\sigma$. For example:

(K, Y, $\sigma$)$\leftarrow$Gen($1^\lambda$)

In some implementations, the Gen operation samples two $\lambda$-bit strings $k_1 \leftarrow \{0,1\}^\lambda$ and $k_2 \leftarrow g^{IND-CPA}(1^\lambda)$, and creates two empty, chained hash tables $Y_f$, $Y_w$ (respectively, an index and an inverted index, as described in further detail herein), and an empty set $\sigma$. In some examples, K=($k_1$, $k_2$) and Y=($Y_f$, $Y_w$). In some examples, the empty search index Y is provided to the server-side computing device. Operations to add files, delete files and/or search files can be performed, as described in further detail with reference to FIGS. 2B-2D.

With particular reference to FIG. 2B, an add file protocol 202 is depicted to provide an encrypted file and a corresponding token to the server-side computing device. In some examples, Enc is a probabilistic operation that takes the secret key K and a file $f$ as input, and outputs an encrypted file c. For example:

c$\leftarrow$Enc(K, $f$)

In some examples, the Enc operation parses the key K=($k_1$, $k_2$) to provide c, where c=$\epsilon_{k_2}^{IND-CPA}(f)$. In some examples, AddToken is a (possibly probabilistic) operation that takes the secret key K, the file $f$ and a search history $\sigma$ as input, and outputs an add token $\alpha_f$. For example:

$\alpha_f \leftarrow$AddToken(K, $f$, $\sigma$)

In some examples, the encrypted file c and the add token $\alpha_f$ are provided to the server-side computing device. In some examples, the AddToken operation parses the key K=($k_1$, $k_2$), and generates, using PRNG G, for example, a sequence of pseudorandom values $s_1, \ldots, s_{len(f)}$, for a sequence of words in a file $f$ having a list $\bar{f}$ of unique words $f \supseteq \bar{f} = w_1, \ldots, w_{len(\bar{f})}$. The AddToken operation also creates an empty list $\mathbb{X}$. In some examples, for every word $w_i \in \bar{f}$, the AddToken operation: determines a corresponding search token $\tau_{w_i} = F_{k_i}(w_i)$, determines whether the search token $\tau_{w_i}$ was used for a previous search (e.g., $\tau_{w_i} \in \sigma$), and, if so, adds $\tau_{w_i}$ to $\mathbb{X}$, and sets $$c_i H_{\tau_{w_i}}(s_i) \| s_i.$$

In some examples, the AddToken operation sorts $\bar{c} = (c_1, \ldots, c_{len(\bar{f})})$ in lexicographic order and sets $\alpha_f = (\text{ID}(f), \bar{c}, \mathbb{X})$.

In some examples, Add is a deterministic operation that takes the add token $\alpha_f$, the encrypted file $c$, a sequence of encrypted files $\mathbf{C}$, and a search index Y as input, and outputs an updated search index Y' and an updated sequence of encrypted files $\mathbf{C}'$. For example:

$$(\mathbf{C}', Y') \leftarrow \text{Add}(\alpha_f, c, \mathbf{C}, Y)$$

In some examples, the Add operation parses $\alpha_f = (\text{ID}(f), \bar{c}, \mathbb{X})$ and $Y = (Y_f, Y_w)$, and sets $\bar{c} = Y_f[\text{ID}(f)]$. Further, for each $x_i \in \mathbb{X}$, the Add operation adds $\text{ID}(f)$ to $Y_w[x_i]$, and updates the ciphertexts $\mathbf{C}$ to $\mathbf{C}'$ by adding $c$. The Add operation outputs $\mathbf{C}'$ and the updated version $Y' = (Y_f, Y_w)$.

With particular reference to FIG. 2C, a search files protocol 204 is depicted to search encrypted files stored by the third-party service provider. In some examples, Search-Token is a (possibly probabilistic) operation that takes the secret key K, a keyword w and the search history $\sigma$ as input, and outputs a new search history $\sigma'$ and a search token $\tau_w$. For example:

$$(\sigma', \tau_w) \leftarrow \text{SearchToken}(K, w, \sigma)$$

In some examples, the SearchToken operation parses the key $K = (k_1, k_2)$, calculates $\tau_w = F_{k_1}(w)$, sets $\sigma' = \sigma \cup \{\tau_w\}$, and outputs $(\sigma', \tau_w)$. The search token $\tau_w$ is provided to the server-side computing device. In some examples, Search is a deterministic algorithm that takes the search token $\tau_w$ and the search index Y as input, and outputs a sequence of identifiers $\mathbb{I}_w$ and an updated search index Y'. For example:

$$(\mathbb{I}_w, Y') \leftarrow \text{Search}(\tau_w, Y)$$

In some examples, the Search operation parses the search index $Y = (Y_f, Y_w)$ and checks whether there is an entry $\tau_w$ for in $Y_w$. If there is an entry $\tau_w$ for in $Y_w$, the Search operation sets $\mathbb{I}_w = Y_w[\tau_w]$ and $Y'_w = Y_w$. If there is not an entry $\tau_w$ for in $Y_w$, the Search operation creates an empty list $\mathbb{I}_w$ and, for every $\bar{c} \in Y_f$ and for every $c_i \in \bar{c}$ that is $i \in [1, \text{len}(c)]$: sets $c_i = l_i \| r_i$ and checks whether $H_{\tau_w}(r_i) = l_i$. If $H_{\tau_w}(r_i) = l_i$, the $\text{ID}(f)$ that corresponds to $\bar{c}$ is inserted into $\mathbb{I}_w$. The Search operation updates $Y'_w$ by creating an entry $Y'_w[\tau_w] = \mathbb{I}_w$, and outputs $\mathbb{I}_w$ and an updated version of $Y' = (Y'_w, Y_f)$. In some examples, one or more encrypted files associated with respective identifiers in the sequence of identifiers $\mathbb{I}_w$ are provided to the client-side computing device (e.g., $\{c_i\}_{i \in \mathbb{I}_w}$). In some examples, Dec is a deterministic operation that takes an encrypted file $c$ and a key K, and outputs a decrypted file $f$. For example:

$$(f) \leftarrow \text{Dec}(K, c)$$

In some examples, the Dec operation parses the key $K = (k_1, k_2)$, and outputs $f = D_{k_2}^{IND-CPA}(c)$.

With particular reference to FIG. 2D, a delete files protocol 206 is depicted to delete encrypted files stored by the third-party service provider. In some examples, Delete is a deterministic operation that takes as input an identifier $\text{ID}(f)$ of a file that is to be deleted by the third-party service provider, the sequence of encrypted files $\mathbf{C}$ and a search index Y as input, and outputs an updated sequence of encrypted files $\mathbf{C}'$ and an updated search index Y'. For example:

$$(\mathbf{C}', Y') \leftarrow \text{Delete}(\text{ID}(f), \mathbf{C}, Y)$$

In some examples, the Delete operation parses $Y = (Y_f, Y_w)$, and, for every list $\mathfrak{E}$ saved in $Y_w$, checks whether $\text{ID}(f) \in \mathfrak{E}$. If $\text{ID}(f) \in \mathfrak{E}$, $\text{ID}(f)$ is removed from the list $\mathfrak{E}$. Further, the Delete operation removes the ciphertext $c$ corresponding to $\text{ID}(f)$ from $\mathbf{C}$, removes $Y_f[\text{ID}(f)]$ from $Y_f$, and outputs an updated set of encrypted files $\mathbf{C}'$ and an updated search index $Y' = (Y_w, Y_f)$.

In some examples, a dynamic searchable encryption scheme is called "correct," if, for all $\lambda \in \mathbb{N}$ all keys K generated by $\text{Gen}(1^\lambda)$ and all sequences of add, delete and search operations on the search index, every search operation returns the correct set of files (e.g., with negligible probability). In an ideal scenario, searchable encryption is implemented in a way that the third-party service provider learns absolutely nothing about either the files or the search queries. Although there are methods available to achieve this relatively strict security goal, such methods require a relatively large overhead (e.g., limited retrieval capability, increased search time, increased index size).

In contrast, implementations of the present disclosure accept allowing the third-party service provider learning particular information (e.g. the access pattern). In this manner, and as described in detail herein, implementations of the present disclosure provide a relatively more efficient searchable encryption scheme. To address the knowledge that the third-party service provider gains (e.g., the access pattern), implementations of the present disclosure use leakage functions, described in further detail herein, which define the additional knowledge that the third-party service provider gains by receiving ciphertexts, add tokens and/or search tokens.

Further, the securely updating index-based searchable encryption scheme of the present disclosure provides correctness with all but negligible probability. In instances of a collision of H, the Search operation outputs a false index $\mathbb{I}_w$ that is for two different search tokens $\tau$, $\tau'$, and two different random numbers s, s' to provide $H(\tau, s) = H(\tau', s')$. Because H is a random oracle with image size $\{0,1\}^\lambda$, a collision occurs for N queries with a probability that is proportional to $N^2 2^{-\lambda}$, and is therefore negligible for N polynomial in $\lambda$. Further, such collisions can result in false positives for $\mathbb{I}_w$ and can be filtered out by the client repeating the search on all decrypted files with IDs contained in $\mathbb{I}_w$. This also holds for a collision of the pseudorandom function F, that is generating two equivalent search tokens for different words.

When accounting for security of a searchable encryption scheme, a difference between security against non-adaptive chosen keyword attacks ("CKA1") and adaptive chosen keyword attacks ("CKA2") should be considered. In some examples, security against CKA 2 guarantees security even when the client's generated query depends on results of previous queries and the search index. In contrast, security against CKA1 guarantees security only when all queries generated by the client are independent of previous queries and the search index. Implementations of the present disclosure achieve the stronger notion of CKA 2 security, and are modified to fit with dynamic searchable symmetric encryption (SSE).

Security of the searchable encryption scheme (SUISE) of the present disclosure is described in further detail with reference to example experiments. The example experiments include a stateful attacker A, a stateful simulator S, and stateful leakage functions $\mathcal{L}_{search}$, $\mathcal{L}_{add}$, and $\mathcal{L}_{encrypt}$. In some examples, the leakage functions can be defined as follows:

$$\mathcal{L}_{search}(\mathbb{f}, w) = (ACCP_t(w), ID(w))$$

$$\mathcal{L}_{add}(\mathbb{f}, f) = (ID(f), len(\tilde{f}), SRCH\_HIS_t(\tilde{f}))$$

$$\mathcal{L}_{encrypt}(f) = len(f)$$

where $ACCP_t(w)$ is the access pattern at time t and is defined as the set $\{ID(f): w \in f_i$ and $f_i \in \mathbb{f}\}$, $\tilde{f}$ is the set of unique words in the file $f$, and $SRCH\_HIS_t(\tilde{f})$ is the set of IDs of all words searched up to time t, which also appear in $\tilde{f}$.

In a first experiment ($Real_A^{SSE}(\lambda)$), the challenger (e.g., client, customer) runs $Gen(1^\lambda)$ to obtain the tuple (K, Y, σ). The attacker A makes a polynomial number of adaptive queries $q \in \{w, f_1, f_2\}$ and, for each query q, the challenger generates either a search token $(\tau_w) \leftarrow SearchToken(K,w,\sigma)$, an add token $\alpha_f \leftarrow AddToken(K, f_1, \sigma)$, or a file encryption $c \leftarrow Enc(K, f_2)$. The attacker A returns a bit b that is output by the first experiment. In a second experiment ($Ideal_{A,S}^{SSE}(\lambda)$), the simulator sets up an internal environment, and the attacker A makes a polynomial number of adaptive queries $q \in \{w, f_1, f_2\}$. For each query q, the simulator is provided with the appropriate leakage function (e.g., $\mathcal{L}_{search}(\mathbb{f}, w)$, $\mathcal{L}_{add}(\mathbb{f}, f_1)$, and $\mathcal{L}_{encrypt}(f_2)$). The simulator returns the appropriate token $\tau_w$, $\alpha_f$, or a ciphertext $\tilde{c}$. The attacker A returns a bit b that is output by the second experiment.

In accordance with implementations of the present disclosure, SUISE is ($\mathcal{L}_{search}$, $\mathcal{L}_{add}$, $\mathcal{L}_{encrypt}$)-secure against adaptive, dynamically chosen-keyword attacks if, for all probabilistic polynomial-time algorithms (indicated as attacker A), there exists a probabilistic polynomial-time simulator S, such that an advantage (ΔPr) of the attacker A is negligible in λ. In some examples, advantage of the attacker A is provided as:

$$\Delta Pr = |Pr[Real_A^{SSE}(\lambda)=1] - Pr[Ideal_{A,S}^{SSE}(\lambda)=1]|$$

As introduced above, the searchable encryption scheme (SUISE) of the present disclosure learns the index based on the access pattern. Initially, a regular index ($Y_f$) is provided, in which one or more encrypted keywords are stored for each document stored. In some examples, once a keyword is searched, all of the file identifiers returned for the search (e.g., see FIG. 2D) are moved to an inverted index ($Y_w$) for the particular keyword. In this manner, the keyword is now the key to the index, and is encrypted (e.g., the encrypted keyword is the search token).

In some implementations, future updates for keywords that have already been searched are accommodated for. In some examples, these keywords and their corresponding file identifiers—are provided in the inverted index. Consequently, an update operation updates the inverted index. In this manner, both indices need not always be searched, which would increase search time. In some implementations, and as introduced above, the search history can be maintained at the client-side. In some examples, the client-side computing device determines whether a keyword has been searched, and, if the keyword has been searched, provides instructions to the server-side computing device to include the keyword in the inverted index.

In some implementations, multiple data structures are provided. Example data structures include lists and hash tables (e.g., chained hash table). In some examples, for a list l, len(l) is the number of elements in l, and $x \in l$, if and only if value x is stored in list l. In some examples, accessing the element at position i is provided as l[i]. A hash table T stores values v associated with respective keys k, and can be provided as T [k]=v. In some examples, $v \in T$, if there is a key k, such that T [k]=v. In some implementations, a value v can be accessed with corresponding key k stored in a hash table in constant time. If the values stored in the hash table are lists, the hash table is referred to as a chained hash table.

Figure 3:
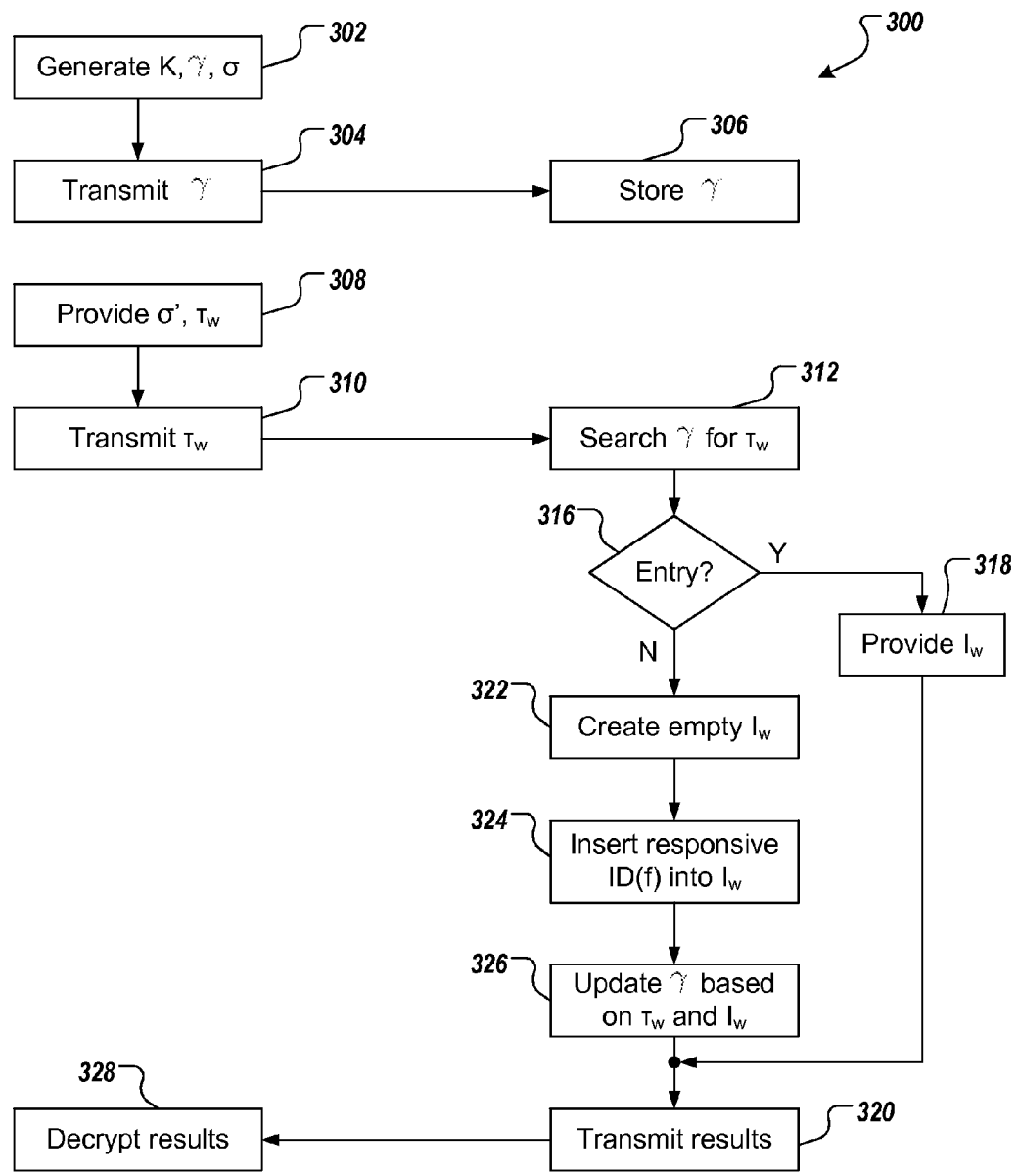
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the example process 300 is executed by a client (e.g., the computing device 102 of FIG. 1) and a server (e.g., the server system 104 of FIG. 1).

A set of keys K, a set of search indices Y, and a search history σ are generated (302). In some examples, the client executes the Gen operation, as described herein, to provide the set of keys $K=(k_1, k_2)$ the set of indices $Y=(Y_f, Y_w)$, where $Y_f$, $Y_w$ are initially empty, and the search history σ, which is initially empty. The set of (empty) search indices Y is transmitted (304). For example, the client transmits the set of search indices Y to the server. The set of search indices Y is stored (306). For example, the server stores the set of search indices Y in computer-writable/-readable memory.

In some examples, and although not depicted in FIG. 3, encrypted data is provided to the server for storage in a database. For example, and with reference to FIG. 2B, described above, the client can perform the Enc operation and the AddToken operation to respectively provide a ciphertext c and an add token $\alpha_f$, which are provided to the server. Further, the server can perform the Add operation to store the ciphertext c and to update the set of indices $Y=(Y_f, Y_w)$, as described herein. In some examples, the Add File protocol of FIG. 2B can be performed numerous times (e.g., hundreds, thousands, millions of times) to stored encrypted data in the database, and respectively update the set of indices Y.

With continued reference to FIG. 3, a modified search history σ' and a search token $\tau_w$ are provided (308). For example, the client executes the SearchToken operation, as described herein, to provide the modified search history σ' and the search token $\tau_w$. The search token $\tau_w$ is transmitted (310). For example, the client transmits the search token $\tau_w$ to the server. In response to receiving the search token $\tau_w$, the set of indices Y is searched based on the search token $\tau_w$ (312). For example, the server performs the Search operation, as described herein. It is determined whether the set of indices Y includes an entry responsive to the search token $\tau_w$ (316). If the set of indices Y includes an entry responsive to the search token $\tau_w$, a set of identifiers $\mathbb{I}_w$ is provided (318). In some examples, the set of identifiers $\mathbb{I}_w$ is provided from the set of search indices Y and includes one or more identifiers ID(f), each identifier ID(f) being assigned to a respective ciphertext c that is responsive to the search token $\tau_w$. Search results are transmitted (320). For example, the server transmits the search results to the client (320). In some examples, the search results include one or more ciphertexts c, which respectively correspond to the one or more identifiers ID(f).

If the set of indices Y does not include an entry responsive to the search token $\tau_w$, an empty set of identifiers $\mathbb{I}_w$ is created (322). In some examples, the encrypted data stored in the database is searched based on the search token $\tau_w$ to provide one or more identifiers ID(f), each identifier ID(f)

being assigned to a respective ciphertext c that is responsive to the search token $\tau_w$. The one or more identifiers ID(f) are inserted into the empty set of identifiers $\mathbb{I}_w$ (324). The set of search indices Y is updated based on the search token $\tau_w$ and the (populated) set of identifiers $\mathbb{I}_w$ (326). For example, an entry is added to the set of search indices Y for the search token $\tau_w$, the entry including the the (populated) set of identifiers $\mathbb{I}_w$.

As described herein, implementations of the present disclosure provide a searchable encryption scheme having updates that leak no additional information, other than the access pattern, that has asymptotically optimal search time, sublinear, very small and asymptotically optimal index size, and that can be implemented without storage on the client (except the key). As also described herein, implementations of the present disclosure provide for learning the index for efficient access based on the access pattern itself.

Figure 4:
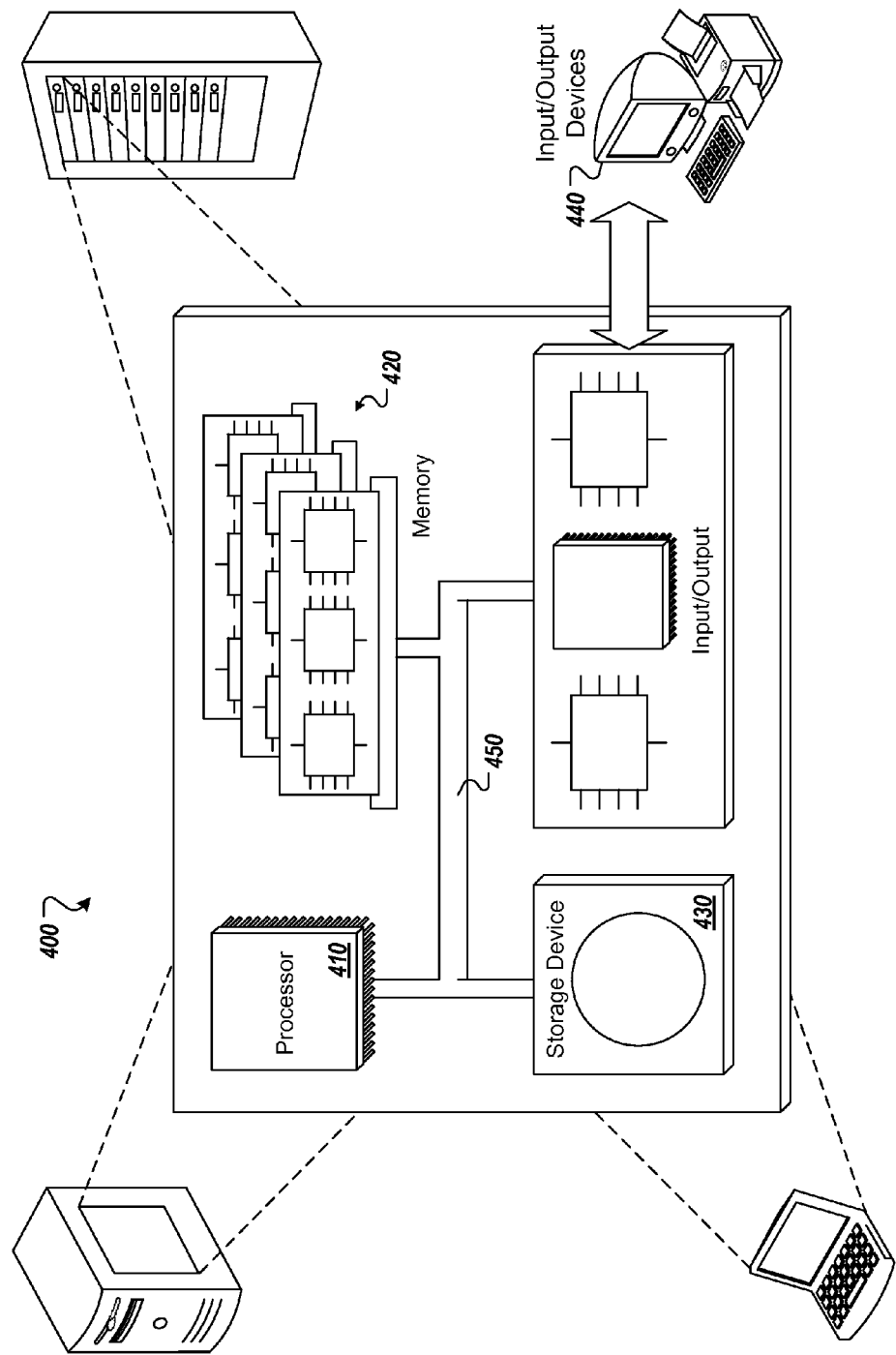
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for using searchable encryption to query a database storing encrypted data, the method being executed using one or more processors and comprising:
   executing, by the one or more processors, at least a portion of a searchable encryption scheme that provides an asymptotically optimal, sub-linear search time and comprises probabilistic operations to generate a set of search indices and a search token;
   receiving, by the one or more processors, the set of search indices;
   receiving, by the one or more processors, the search token, and in response:
      searching, by the one or more processors, at least, one search index of the set of search indices based on the search token, and
      determining, by the one or more processors, that the at least one search index corresponds to an initial setup protocol, wherein the at least one search index comprises an empty table that is absent an entry and is absent a search history of previously submitted search tokens corresponding to the search token, and in response, receiving one or more identifiers, each identifier being associated with a respective ciphertext comprising an access pattern that is determined to be responsive to the search token, and updating the at least one search index to comprise the entry based on the search token and the one or more identifiers and to comprise the search history of the search token by using an inverted index for the search token; and
   transmitting, by the one or more processors, search results, the search results comprising the one or more ciphertexts that are determined to be responsive to the search token.

2. The method of claim 1, further comprising receiving an add token and a ciphertext, and in response, updating the set of search indices based on the add token.

3. The method of claim 2, wherein the add token comprises an identifier assigned to the ciphertext and search tokens associated with the ciphertext, the search tokens having been used for a previous search.

4. The method of claim 1, further comprising receiving an identifier assigned to a ciphertext that is stored as encrypted data in the database, and in response:
   deleting the ciphertext; and
   updating the at least on index of the set of indices.

5. The method of claim 1, wherein the set of search indices are provided based on a set of keys stored at a client-side computing device and are received from the client-side computing device, at least one key in the set of keys being used to provide the encrypted data stored in the database.

6. The method of claim 1, wherein the search token comprises an encrypted keyword.

7. The method of claim 1, wherein the set of search indices comprises an encrypted document index and an encrypted keyword index, the encrypted keyword index being an inversion of the encrypted document index.

8. A non-transitory computer-readable storage medium coupled to one or more processors and having instructions stored thereon which, when executed by the one or more processors, cause the one or more processors to perform operations for using searchable encryption to query a database storing encrypted data, the operations comprising:
   executing at least a portion of a searchable encryption scheme that provides an asymptotically optimal sub-linear search time and comprises probabilistic operations to generate a set of search indices and a search token;
   receiving the set of search indices;
   receiving the search token, and in response:
      searching at least one search index of the set of search indices based on the search token, and
      determining that the at least one search index corresponds to an initial setup protocol, wherein the at least one search index comprises an empty table that is absent an entry and is absent a search history of previously submitted search tokens corresponding to the search token, and in response, receiving one or more identifiers, each identifier being associated with a respective ciphertext comprising an access pattern that is determined to be responsive to the search token, and updating the at least one search index to comprise the entry based on the search token and the one or more identifiers and to comprise the search history of the search token by using an inverted index for the search token; and
   transmitting search results, the search results comprising the one or more ciphertexts that are determined to be responsive to the search token.

9. The computer-readable storage medium of claim 8, wherein operations further comprise receiving an add token and a ciphertext, and in response, updating the set of search indices based on the add token.

10. The computer-readable storage medium of claim 9, wherein the add token comprises an identifier assigned to the ciphertext and search tokens associated with the ciphertext, the search tokens having been used for a previous search.

11. The computer-readable storage medium of claim 8, wherein operations further comprise receiving an identifier assigned to a ciphertext that is stored as encrypted data in the database, and in response:
   deleting the ciphertext; and
   updating the at least on index of the set of indices.

12. The computer-readable storage medium of claim 8, wherein the set of search indices are provided based on a set of keys stored at a client-side computing device and are received from the client-side computing device, at least one key in the set of keys being used to provide the encrypted data stored in the database.

13. The computer-readable storage medium of claim 8, wherein the search token comprises an encrypted keyword.

14. The computer-readable storage medium of claim 8, wherein the set of search indices comprises an encrypted document index and an encrypted keyword index, the encrypted keyword index being an inversion of the encrypted document index.

15. A system, comprising:
   a computing device; and
   a computer-readable storage device coupled to the computing device and having instructions stored thereon which, when executed by the computing device, cause the computing device to perform operations for using searchable encryption to query a database storing encrypted data, the operations comprising:
      executing at least a portion of a searchable encryption scheme that provides an asymptotically optimal sublinear search time and comprises probabilistic operations to generate a set of search indices and a search token;
receiving the set of search indices;
receiving the search token, and in response:
   searching at least one search index of the set of search indices based on the search token, and
   determining that the at least one search index corresponds to an initial setup protocol, wherein the at least one search index comprises an empty table that is absent an entry and is absent a search history of previously submitted search tokens corresponding to the search token, and in response, receiving one or more identifiers, each identifier being associated with a respective ciphertext comprising an access pattern that is determined to be responsive to the search token, and updating the at least one search index to comprise the entry based on the search token and the one or more identifiers and to comprise the search history of the search token by using an inverted index for the search token; and
transmitting search results, the search results comprising the one or more ciphertexts that are determined to be responsive to the search token.

16. The system of claim 15, wherein operations further comprise receiving an add token and a ciphertext, and in response, updating the set of search indices based on the add token.

17. The system of claim 16, wherein the add token comprises an identifier assigned to the ciphertext and search tokens associated with the ciphertext, the search tokens having been used for a previous search.

18. The system of claim 15, wherein operations further comprise receiving an identifier assigned to a ciphertext that is stored as encrypted data in the database, and in response:
   deleting the ciphertext; and
   updating the at least on index of the set of indices.

19. The system of claim 15, wherein the set of search indices are provided based on a set of keys stored at a client-side computing device and are received from the client-side computing device, at least one key in the set of keys being used to provide the encrypted data stored in the database.

20. The system of claim 15, wherein the search token comprises an encrypted keyword.

\* \* \* \* \*